US012688679B2

(12) United States Patent
Nakamura

(10) Patent No.: US 12,688,679 B2
(45) Date of Patent: Jul. 21, 2026

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Koichiro Nakamura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 404 days.

(21) Appl. No.: 18/305,453

(22) Filed: Apr. 24, 2023

(65) Prior Publication Data

US 2024/0005644 A1    Jan. 4, 2024

(30) Foreign Application Priority Data

May 20, 2022    (JP) ................................. 2022-083265

(51) Int. Cl.
*G06V 10/774*        (2022.01)
*G06V 40/16*         (2022.01)

(52) U.S. Cl.
CPC .......... *G06V 10/774* (2022.01); *G06V 40/172* (2022.01)

(58) Field of Classification Search
CPC ........................... G06V 10/774; G06V 40/172
See application file for complete search history.

(56) References Cited

U.S. PATENT DOCUMENTS

2023/0067730 A1    3/2023    Nakamura

FOREIGN PATENT DOCUMENTS

CN         112651461 A  *  4/2021  .......... G06F 18/241

OTHER PUBLICATIONS

RoyChowdhury et al: "Improving Face Recognition by Clustering Unlabeled Faces in the Wild", 2020 (Year: 2020).*
Xu, X. et al., "Consistent Instance False Positive Improves Fairness in Face Recognition" arXiv:2106.05519v1 (Jun. 2021) pp. 1-9.
Deng, J. et al., "ArcFace: Additive Angular Margin Loss for Deep Face Recognition" 2019 IEEE/CVF Conference on Computer Vision and Pattern Recognition (CVPR) (Jun. 2019) pp. 4690-4699.
He, K. et al., "Identity mappings in deep residual networks" arXiv:1603.05027v3 (Jul. 2016) pp. 1-15.
Devries, T. et al., "Improved Regularization of Convolutional Neural Networks with Cutout" arXiv:1708.04552v2 (Nov. 2017) pp. 1-8.

* cited by examiner

*Primary Examiner* — Ruiping Li
(74) *Attorney, Agent, or Firm* — Carter, DeLuca & Farrell LLP

(57)        ABSTRACT

An image processing apparatus comprises one or more processors, and one or more memories storing executable instructions which, when executed by the one or more processors, cause the image capturing control apparatus to function as: a first acquiring unit configured to acquire a degree of training of a training target in a training model, a second acquiring unit configured to acquire, based on degrees of training of a plurality of training targets, a sampling probability of an image of each of the plurality of training targets, and a training unit configured to perform training of the training model, based on a sampling image that is sampled from images of the plurality of training targets based on the sampling probability acquired by the second acquiring unit.

12 Claims, 6 Drawing Sheets

F I G.  2
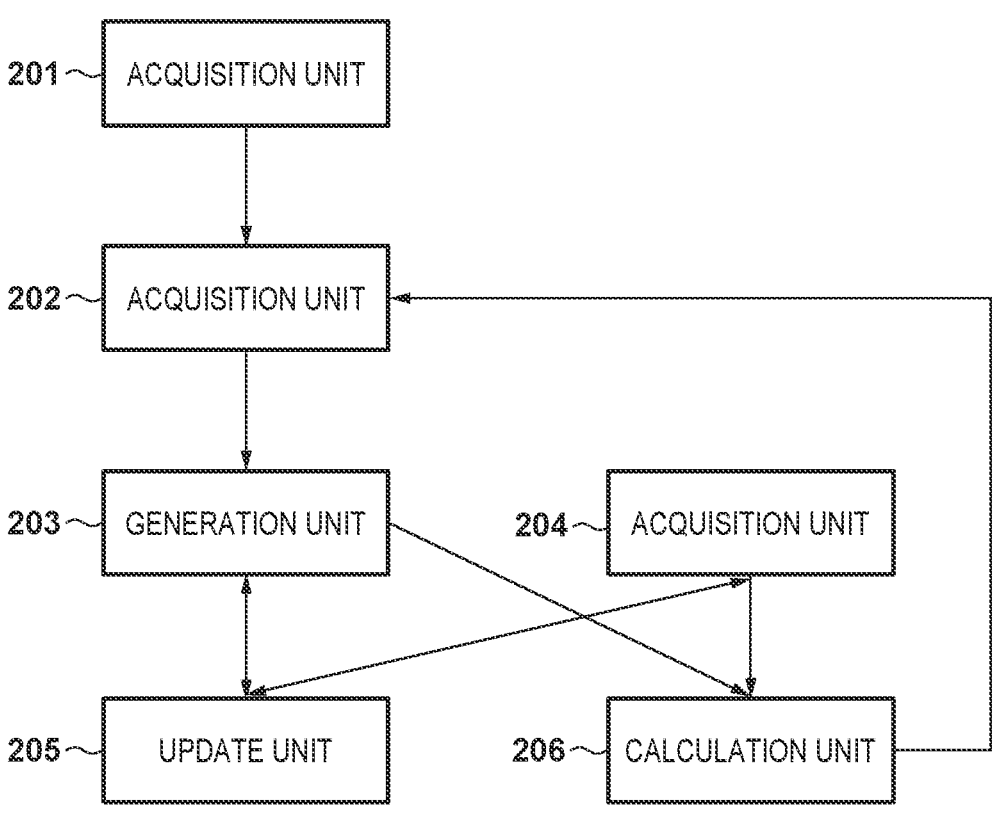

START

S101 — TRAINING LOOP

S102 — FACE IMAGE OBTAINMENT PROCESS

S103 — TRAINING PROCESS

S104 — TERMINATION OF TRAINING LOOP

END

START

S201 — OBTAIN DEGREE OF TRAINING

S202 — CALCULATE SAMPLING PROBABILITY

S203 — FACE IMAGE ACQUISITION LOOP

S204 — SELECT PERSON ID

S205 — ACQUIRE FACE IMAGE

S206 — TERMINATION OF FACE IMAGE ACQUISITION LOOP

END

FIG. 5

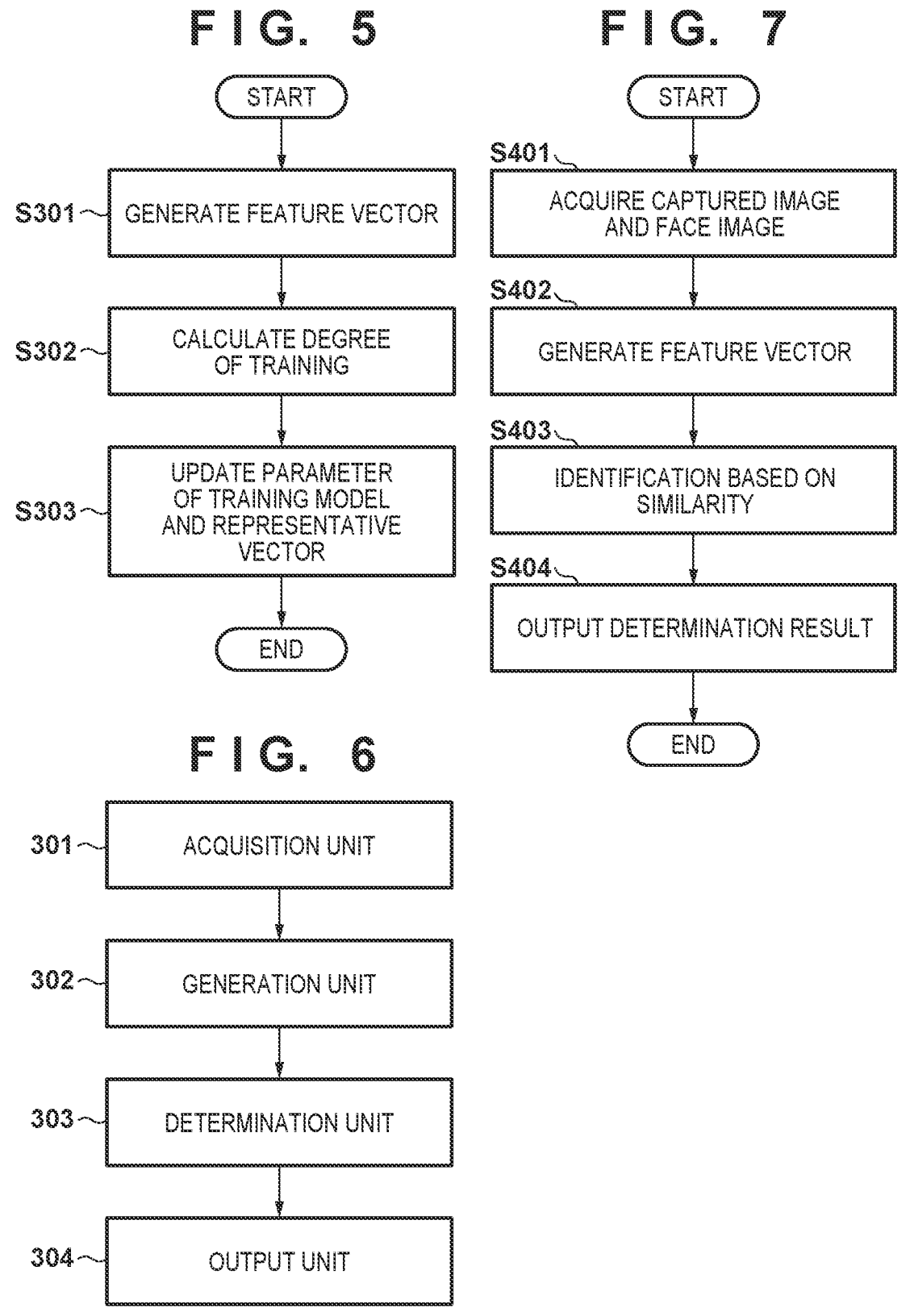

START

S301 — GENERATE FEATURE VECTOR

S302 — CALCULATE DEGREE OF TRAINING

S303 — UPDATE PARAMETER OF TRAINING MODEL AND REPRESENTATIVE VECTOR

END

FIG. 7

START

S401 — ACQUIRE CAPTURED IMAGE AND FACE IMAGE

S402 — GENERATE FEATURE VECTOR

S403 — IDENTIFICATION BASED ON SIMILARITY

S404 — OUTPUT DETERMINATION RESULT

END

FIG. 6

301 — ACQUISITION UNIT

302 — GENERATION UNIT

303 — DETERMINATION UNIT

304 — OUTPUT UNIT

START

S101 — TRAINING LOOP

S102 — FACE IMAGE OBTAINMENT PROCESS

S503 — PROCESSING OPERATION

S103 — TRAINING PROCESS

S104 — TERMINATION OF TRAINING LOOP

END

START

S601 — OBTAIN DEGREE OF TRAINING

S602 — CALCULATE PROCESSING APPLICATION PROBABILITY

S603 — FACE IMAGE PROCESS LOOP

S604 — FACE IMAGE PROCESS

S605 — TERMINATION OF FACE IMAGE PROCESS LOOP

END

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to a training technique to acquire a training model.

Description of the Related Art

In recent years, bias in face recognition due to attributes such as race and gender is being regarded as a problem. Bias is strongly affected by an imbalance in training data. In mini-batch training which is mainly used as a training method to acquire a training model, a sampling frequency of attribute data having a small amount of data decreases, making it difficult to improve a degree of training such attributes. Bias therefore occurs depending on the amount of data for each attribute. In the technique disclosed in Xingkun Xu et al. Consistent Instance False Positive Improves Fairness in Face Recognition. In CVPR 2021., bias is reduced by adjusting a loss function in accordance with the degree of training for each piece of data.

However, the technique disclosed in Xingkun Xu et al. Consistent Instance False Positive Improves Fairness in Face Recognition. In CVPR 2021. cannot solve inconsistencies in the sampling frequency of the mini-batch training caused by bias.

SUMMARY OF THE INVENTION

The present invention provides a technique for enabling training to acquire a training model based on a sample image that is sampled based on a sampling probability of an image of a training target corresponding to a degree of training of the training target.

According to the first aspect of the present disclosure, there is provided an image processing apparatus comprising: one or more processors; and one or more memories storing executable instructions which, when executed by the one or more processors, cause the image capturing control apparatus to function as: a first acquiring unit configured to acquire a degree of training of a training target in a training model; a second acquiring unit configured to acquire, based on degrees of training of a plurality of training targets, a sampling probability of an image of each of the plurality of training targets; and a training unit configured to perform training of the training model, based on a sampling image that is sampled from images of the plurality of training targets based on the sampling probability acquired by the second acquiring unit.

According to the second aspect of the present disclosure, there is provided an image processing method performed by an image processing apparatus, the method comprising: acquiring a degree of training of a training target in a training model; acquiring, based on degrees of training of a plurality of training targets, a sampling probability of an image of each of the plurality of training targets; and performing training of the training model, based on a sampling image that is sampled from images of the plurality of training targets based on the sampling probability acquired.

According to the third aspect of the present disclosure, there is provided a non-transitory computer-readable storage medium storing a computer program for causing a computer to function as: a first acquiring unit configured to acquire a degree of training of a training target in a training model; a second acquiring unit configured to acquire, based on degrees of training of a plurality of training targets, a sampling probability of an image of each of the plurality of training targets; and a training unit configured to perform training of the training model, based on a sampling image that is sampled from images of the plurality of training targets based on the sampling probability acquired by the second acquiring unit.

Further features of the present invention will become apparent from the following description of exemplary embodiments with reference to the attached drawings.

BRIEF DESCRIPTION OF THE DRAWINGS

FIG. 2 is a block diagram illustrating a functional configuration example of a training apparatus.

FIG. 5 is a flowchart illustrating in detail the process in step S103.

FIG. 6 is a block diagram illustrating a functional configuration example of an inference apparatus.

FIG. 7 is a flowchart illustrating a face recognition process.

DESCRIPTION OF THE EMBODIMENTS

Figure 1:
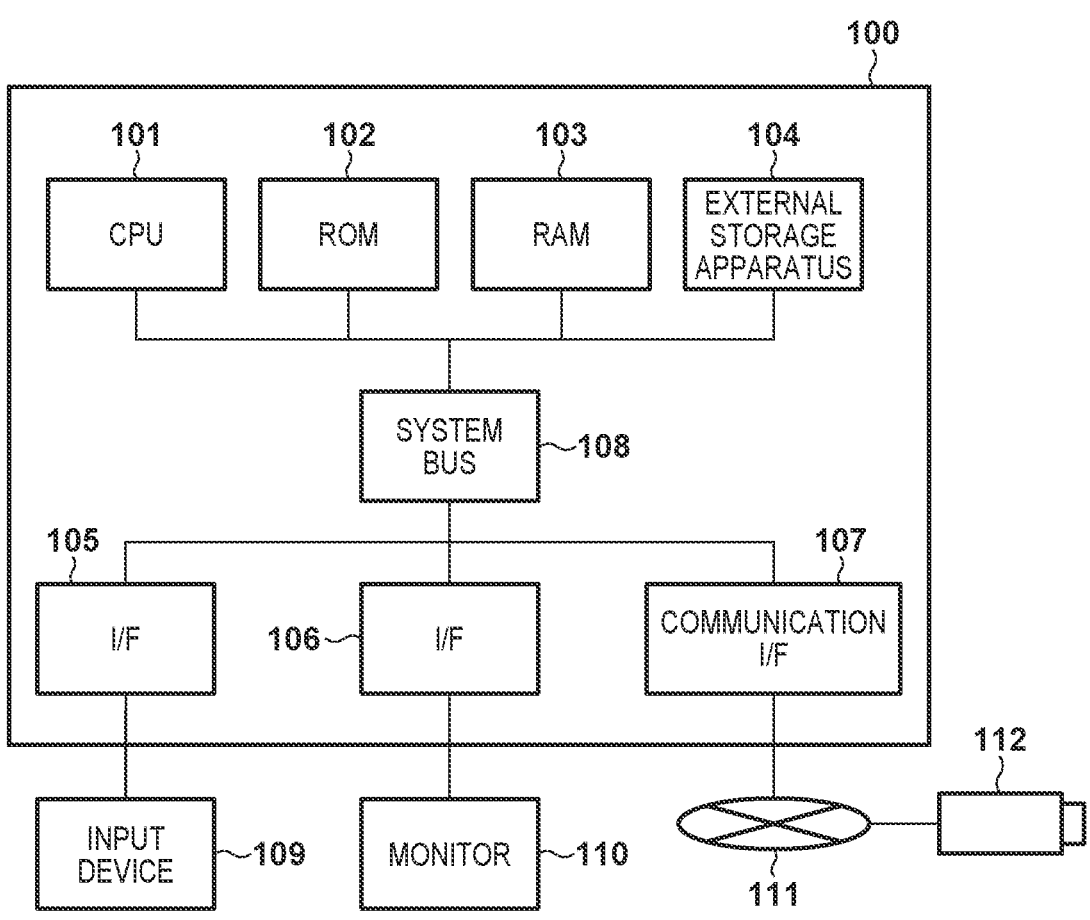
FIG. 1 is a block diagram illustrating a hardware configuration example of a system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

In the present embodiment, an example will be described in which an image processing apparatus acquires a degree of training of a training target in a training model; acquires, based on degrees of training of a plurality of training targets, a sampling probability of an image of each of the plurality of training targets; and performs training to acquire the training model, based on the sampling probability of the image of each of the plurality of training targets based on a sample image that is sampled from a plurality of the images of the corresponding plurality of training targets. In the present embodiment, a case will be described in which the training target is a person's face.

A hardware configuration example of a system according to the present embodiment will be described using the block diagram of FIG. 1. As illustrated in FIG. 1, the system according to the present embodiment includes an image processing apparatus 100 and an imaging apparatus 112, the image processing apparatus 100 and the imaging apparatus 112 being able to perform data communication with each other via a network 111 that is wired and/or wireless. An input device 109 and a monitor 110 are connected to the image processing apparatus 100.

The imaging apparatus 112 will first be described. The imaging apparatus 112 captures a moving image in a range corresponding to an imaging direction and angle of view thereof, and transmits, to the image processing apparatus 100 via the network 111, an image of each frame in the moving image as a captured image. Note that the imaging apparatus 112 may capture a still image at regular or irregular intervals and transmit, to the image processing apparatus 100 via the network 111, the captured still image as a captured image.

The image processing apparatus 100 will be described next. A computer apparatus such as a personal computer (PC), a smartphone and a tablet terminal apparatus is applicable as the image processing apparatus 100.

A CPU 101 executes various types of processing by using a computer program or data stored in a ROM 102 or a RAM 103. Accordingly, the CPU 101 controls an operation of the entire image processing apparatus 100 and executes or controls various types of processing described under the assumption of being performed by the image processing apparatus 100.

Setting data of the image processing apparatus 100, a computer program or data related to booting the image processing apparatus 100, a computer program and data related to the basic operation of the image processing apparatus 100, or the like are stored in the ROM 102.

The RAM 103 has an area for storing computer programs or data loaded from the ROM 102 or an external storage apparatus 104, and an area for storing captured images received from the imaging apparatus 112 through a communication OF 107. The RAM 103 further has a work area used when the CPU 101 executes various types of processing. As such, the RAM 103 can provide various areas as appropriate.

The external storage apparatus 104 is a large-capacity information storage device (non-volatile memory) such as a hard disk drive. An operating system (OS), a computer program or data for causing the CPU 101 to execute or control various types of processing described under the assumption of being performed by the image processing apparatus 100, or the like are stored in the external storage apparatus 104. The computer program or data stored in the external storage apparatus 104 is loaded into the RAM 103 as appropriate in accordance with the control by the CPU 101, and is subjected to processing by the CPU 101.

Note that the external storage apparatus 104 may include an optical disk such as a flexible disk (FD) or a compact disc (CD), a magnetic or optical card, an IC card, a memory card or the like, that is removable from the image processing apparatus 100.

The input device 109 is connected to an I/F 105. The input device 109 is a user interface such as a keyboard, a mouse, or a touch panel, and can be operated by a user to input various instructions to the CPU 101.

The monitor 110 is connected to an OF 106. A monitor 110 includes a liquid crystal screen or a touch panel screen and can display a result of the processing by the CPU 101 with an image, characters, or the like. When the monitor 110 includes a touch panel screen, it is possible to receive an operation input such as a touch or swipe from the user. The CPU 101 is notified of the operation input.

The communication OF 107 is an interface for connecting the image processing apparatus 100 to the network 111, and the image processing apparatus 100 performs data communication with the imaging apparatus 112 in the network 111 via the communication OF 107.

The CPU 101, the ROM 102, the RAM 103, the external storage apparatus 104, the OF 105, the OF 106, and the communication OF 107 are each connected to a system bus 108. Note that the configuration illustrated in FIG. 1 is an example of a configuration applicable to the system according to the present embodiment and can be appropriately changed/modified.

A functional configuration example of a training apparatus that performs training to acquire the training model is illustrated in a block diagram of FIG. 2. In the present embodiment, a case will be described in which the image processing apparatus 100 is applied to such a training apparatus. In the present embodiment, a case will be described in which each functional unit illustrated in FIG. 2 is implemented by software (computer program). Hereinafter, each functional unit illustrated in FIG. 2 will be described as the main subject of processing, but a function of each functional unit is actually implemented by the CPU 101 executing a computer program corresponding to each functional unit. Note that one or more of the functional units illustrated in FIG. 2 may be implemented by hardware.

Figures 3, 4:
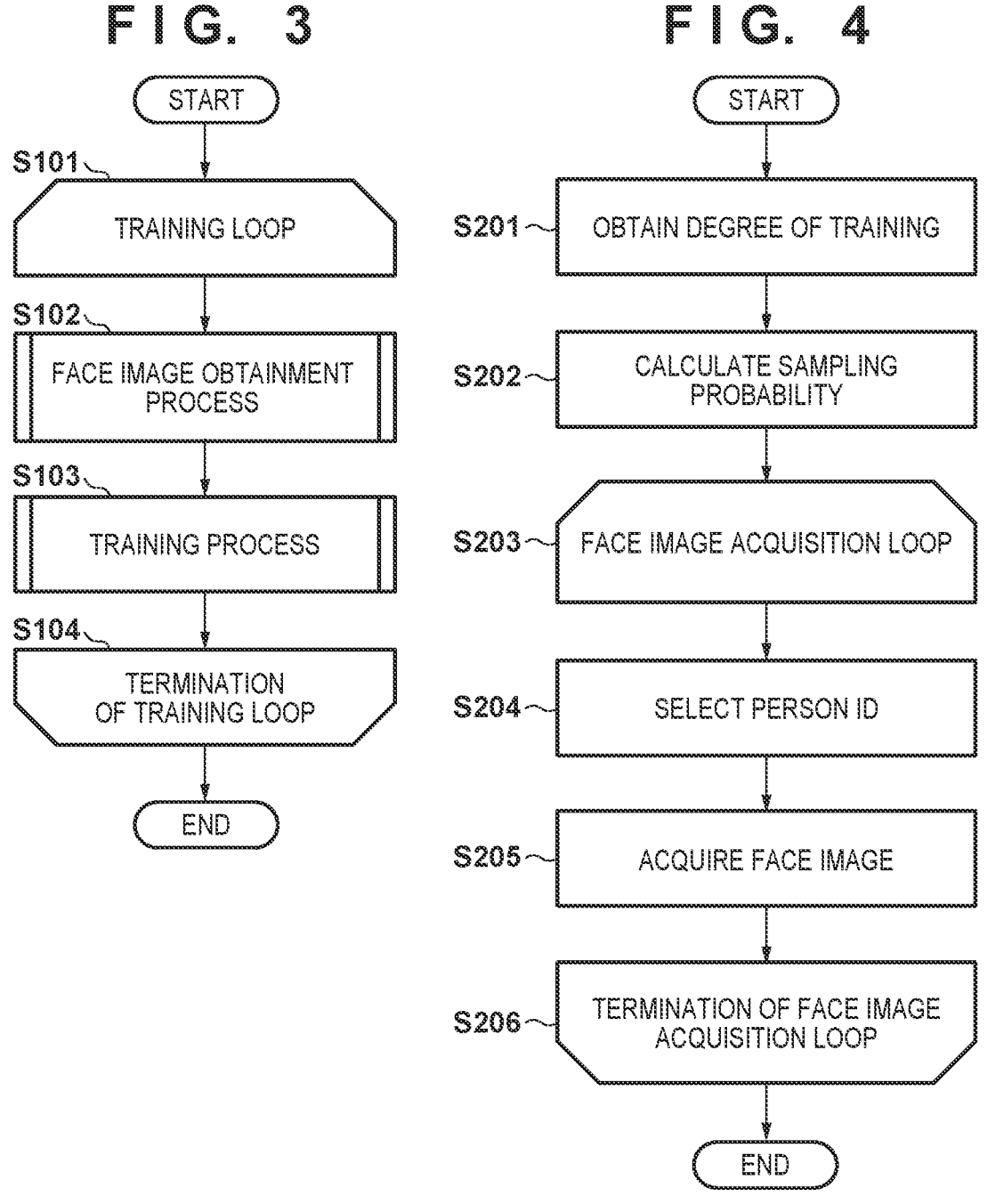
FIG. 3 is a flowchart of a training process to acquire a training model.
FIG. 4 is a flowchart illustrating in detail the process in step S102.

A training process performed by the training apparatus to acquire the training model will be described with reference to the flowchart of FIG. 3. In the present embodiment, a case will be described in which a Convolutional Neural Network (CNN) is used as the training model, but the following description is similarly applicable to other training models. In the present embodiment, a training process to acquire the training model for face recognition through a "representative vector method" known in the document "Jiankang Deng, et. al, ArcFace: Additive Angular Margin Loss for Deep Face Recognition. In CVPR, 2019" and the like will be described as an example. The "representative vector method" is a face recognition training method of mapping feature vectors to each person's face (face image) included in training data, increasing training efficiency by using these in combination. For example, in a case in which the training data includes face images of n (n is a natural number greater than or equal to 2) persons, a representative vector is a vector including a fully connected layer $$W \in \mathbb{R}^{d \times n}$$

adjacent to an output layer of the training model, and the representative vector $$W_j \in \mathbb{R}^d$$

is a representative vector corresponding to a person ID=j. The person ID is identification information unique to each person. d is the number of dimensions of the representative vector. A feature vector $x_i$ obtained (generated) by inputting a face image of a person with a person ID=i (image of a training target of interest) to a training model and causing the training model to operate is defined as follows.

$$x_i \in \mathbb{R}^d$$

In the present embodiment, in the training to acquire the training model, an inter-vector distance $$\theta_{x_i W_j}$$

5 based on a cosine similarity between the feature vector $x_i$ and a representative vector $W_j$ is used as shown in the following equation (1). For example, the training to acquire the training model is performed by updating a parameter (e.g., weighting coefficient) of the training model such that an inter-vector distance of $$\theta_{x_i W_i}$$

between a representative vector $W_i$ and the feature vector $x_i$ (i.e., the inter-vector distance between the representative vector $W_i$ and the feature vector $x_i$ of the same person (person with the person ID=i)) has a smaller value, and the summation $$\sum_{j=1, j \neq i}^{n} \theta_{x_i W_j}$$

with the index j as variable of the inter-vector distances between the feature vector $x_i$ of the person with the person ID=i and the representative vector $W_j$ of the person with the person ID=j has a greater value.

$$\cos\theta_{x_i W_j} = \frac{x_i W_j}{\|x_i\|\|W_j\|} \quad (1)$$

In the present embodiment, the degree of training of the training model with respect to the person is obtained in accordance with the number of representative vectors (other than the representative vector of the person with the person ID=i) having a small inter-vector distance from the feature vector obtained from the training model into which the face image of the person with the person ID=i has been input. A sampling frequency of the face image of each person is controlled so that the sampling frequency of the face image of a person with a low degree of training is high and the sampling frequency of the face image of a person with a high degree of training is low. Training to acquire the training model is performing using the face image of each person sampled in accordance with the controlled sampling frequency.

In the present embodiment, a training loop of steps S101 to S104 is repeatedly performed until a training end condition is satisfied. The training end condition includes, for example, the number of training iterations reaching a predetermined number of times, a time elapsed since the start of the training reaches a predetermined amount of time, a training error is less than or equal to a predetermined value, or a change amount in the training error is less than or equal to a predetermined amount. Note that the training end condition may be a combination of two or more conditions.

In step S102, a face image of each person is obtained to be used for training to acquire the training model. In step S103, training to acquire the training model is performed using the face image of each person acquired in step S102.

The process in step S102 will be described in detail with reference to the flowchart of FIG. 4. In step S201, an acquisition unit 202 acquires a degree of training obtained by a calculation unit 206 in a previous step S302.

In step S202, the acquisition unit 202 acquires, for each of the n persons, the probability (sampling probability) of sampling the face image of the person from the training data among the managed "degree of training of each of the n persons". For example, assuming that the degree of training of the person with the person ID=i is $N_i$, the acquisition unit 202 obtains a sampling probability $P_i$ of the person with the person ID=i in accordance with the following equation (2).

$$P_i = 1 - \frac{N_i}{\sum_{j=1}^{n} N_j} \quad (2)$$

Note that as long as the sampling probability $P_i$ (sampling frequency) of a person having a higher degree of training $N_i$ is lower and the sampling probability $P_i$ (sampling frequency) of a person having a lower degree of training $N_i$ is higher, the equation for obtaining the sampling probability $P_i$ is not limited to the above equation (2).

Note that in step S201 of the first iteration, the acquisition unit 202 may acquire and manage a value set in advance as the degree of training of each of the n persons. The acquisition unit 202 may acquire predetermined values (real numbers between 0 and 1) as the sampling probabilities $P_i$ to $P_n$, in which case, the process of step S202 is unnecessary.

The processes of steps S203 to S206 are then repeated for a predetermined number of times (e.g., a predetermined number of batch sizes). In step S204, the acquisition unit 202 selects one from person IDs=1 to n based on the sampling probabilities $P_1$ to $P_n$. For example, it is assumed that n=3 and $P_1$=(30%), $P_2$=0.2 (20%), and $P_3$=0.5 (50%) are respectively obtained as the sampling probabilities of $P_1$ to $P_3$. In this case, as a [1, 1, 1, 2, 2, 3, 3, 3, 3, 3] array, an array is generated in which (the number of elements in an array×$P_i$) person IDs=i are arranged, making it possible to select the person ID based on the sampling probability by randomly selecting one person ID from the array.

In step S205, the acquisition unit 202 selects one face image group of the person with the person ID selected in step S204 in the training data (including a face image group of each of n persons) read from the external storage apparatus 104 by the acquisition unit 201.

The process in step S103 will be described next in detail with reference to the flowchart of FIG. 5. In step S301, a generation unit 203 inputs each of the face images selected in step S205 (the face images of the person with the person ID selected in step S204) into the training model, and acquires a feature vector of the face image obtained by causing the training model to operate (forward processing). As described above, in the present embodiment, a CNN is used as the training model.

The CNN extracts information abstracted from an input image by repeatedly performing a processing set of "convolution processing, activation processing, pooling processing" on the input image. At this time, a unit of processing including the convolution processing, the activation processing, and the pooling processing is often referred to as a hierarchy. Several methods are known for the activation processing used at this time, but a method called Rectified Linear Unit (ReLU) may, for example, be used. Several methods are known for the pooling processing as well, but, a method called Max pooling may, for example, be used. For example, for the structure of the CNN, a ResNet or the like introduced in non-patent document "K. He, X. Zhang, S. Ren, and J. Sun. Identity mappings in deep residual networks. In ECCV, 2016." and the like may be used.

In step S302, the calculation unit 206 obtains the degree of training of the person with the person ID selected in step S204 by using the feature vectors of the respective persons acquired in step S301 and the representative vectors of the respective n persons acquired by the acquisition unit 204 from the external storage apparatus 104. For example, the calculation unit 206 obtains the degree of training $N_i$ of the person ID=i in accordance with the following equation (3).

$$N_i = \frac{1}{\sum_{j=1, j \neq i}^{n} I(\cos\theta_{x_i W_j} > T_u)} \quad (3)$$

Here, $T_u$ is a threshold value for determining whether the feature vector $x_i$ and the representative vector $W_j$ are close to each other. I(s) is a function that returns 1 if s is true and 0 if s is false. Note that for the equation in which the value of $N_i$ becomes smaller as the number of j satisfying the following inequality $$\cos\theta_{x_i W_j} > T_u$$

becomes greater and the value of $N_i$ becomes greater as the number of j satisfying the inequality becomes smaller, the equation is not limited to equation (3) and any equation may be used.

For the equation in which the value of $N_i$ becomes smaller as the number of representative vectors whose inter-vector distance from the feature vector $x_i$ is smaller than the threshold value becomes greater, and the value of $N_i$ becomes greater as the number of representative vectors whose inter-vector distance from the feature vector $x_i$ is smaller than the threshold value becomes smaller, any equation may be used to obtain $N_i$.

In step S201 of the next iteration, the acquisition unit 202 acquires the "degree of training of the person with the person ID selected in step S204" obtained as such, and updates the degree of training of the person with the person ID among the degree of training of each of the n managed persons to the acquired degree of training. Accordingly, the acquisition unit 202 can manage the latest degree of training for each of the n persons.

In step S303, an update unit 205 performs the training process to acquire the training model by updating the parameter of the training model using the feature vector acquired in step S301 and the representative vector of the person with the person ID selected in step S204 from among the representative vectors of the n persons acquired by the acquisition unit 204 from the external storage apparatus 104. The update unit 205 then stores in the external storage apparatus 104 the representative vectors obtained through the training. As a result, the latest representative vector of each of the n persons is always stored in the external storage apparatus 104.

For example, the method using a loss function such as ArcFace disclosed in the document "Jiankang Deng, et. al, ArcFace: Additive Angular Margin Loss for Deep Face Recognition. In CVPR, 2019" is applicable as a method of updating the parameters of the training model.

Note that in FIG. 5, the processing is executed in the order of steps S302 and S303, but the processing order of steps S302 and S303 is not limited thereto. For example, steps S303 and S302 may be executed in this order, or the process of step S302 and the process of step S303 may be executed in parallel.

A functional configuration example is illustrated in the block diagram of FIG. 6 in which an inference apparatus performs inference on a main task using the training model trained by the training apparatus. In the present embodiment, since the main task is face recognition, whether the regis-tered face image and the face in the input image are the face of the same person is determined during the inference of the main task.

The face recognition process by the inference apparatus will be described with reference to the flowchart of FIG. 7.

In step S401, an acquisition unit 301 acquires the face image of the user registered in the external storage apparatus 104 and the captured image captured by the imaging apparatus 112. A method and a configuration for acquiring the face image of the user registered in the external storage apparatus 104 and the captured image captured by the imaging apparatus 112 are not limited to a specific method and configuration.

For example, for each of a plurality of users, a set of recognition information of the user and an image (face image) of the face of the user is registered in the external storage apparatus 104. When the user operates the input device 109 to input their recognition information (user ID, password, and the like), the acquisition unit 301 checks whether the input recognition information has been regis-tered in the external storage apparatus 104. As a result of this check, the acquisition unit 301 then determines that the first recognition has succeeded in a case in which the face image has been registered, and acquires the face image forming a set with the input recognition information from the external storage apparatus 104. On the other hand, the imaging apparatus 112 is provided so as to be able to capture the face of the user operating the input device 109, and the acquisi-tion unit 301 instructs the user to face the imaging apparatus 112 when a first recognition is successful. The user may be notified of the instruction by displaying a message on the monitor 110 or through speech. After a certain time elapses since the user has operated the input device 109, the imaging apparatus 112 performs capturing and the acquisition unit 301 acquires a captured image obtained through the captur-ing. Note that the method of instructing the imaging appa-ratus 112 to start capturing is not limited to a specific method.

In step S402, a generation unit 302 operates similarly to the generation unit 203, and inputs the face image of the user acquired by the acquisition unit 301 in step S401 into the training model trained by the training apparatus to acquire a feature vector of the face image obtained by causing the training model to operate. Similarly, the generation unit 302 inputs the captured image acquired by the acquisition unit 301 in step S401 into the training model trained by the training apparatus and acquires a feature vector of the captured image obtained by causing the training model to operate.

In step S403, a determination unit 303 obtains a degree of similarity between the feature vector of the face image acquired in step S402 and the feature vector of the captured image acquired in step S402. For example, the determination unit 303 obtains, as the degree of similarity, the reciprocal of the Euclidean distance between the feature vector of the face image acquired in step S402 and the feature vector of the captured image acquired in step S402.

If the degree of similarity is greater than or equal to a threshold value, the determination unit 303 then determines that the user is the user themselves corresponding to the recognition information, and as a result, determines that a second recognition is successful. On the other hand, when the degree of similarity is less than the threshold value, the determination unit 303 determines that the user is not the user themselves corresponding to the recognition informa-tion, and as a result, determines that the second recognition has failed.

In step S404, an output unit 304 outputs the result of the second recognition in step S403. The output form of the result of the second recognition is not limited to a specific output form. For example, the output unit 304 may display the result of the second recognition on the monitor 110 using an image, characters, or the like. For example, in a case in which the result of the second recognition is successful (the user is the user themselves corresponding to the recognition information), the output unit 304 may display an image or characters indicating "login successful" on the monitor 110. For example, in a case in which the result of the second recognition has failed (the user is not the user themselves corresponding to the recognition information), the output unit 304 may display an image or characters indicating "login failed" on the monitor 110.

For example, the output unit 304 may store the result of the second recognition in the external storage apparatus 104. In this case, when the result of the second recognition indicating failure is continuously stored in the external storage apparatus 104 for a predetermined number of times, the inference apparatus may perform a process such as notifying an administrator user of the possibility of unauthorized access.

For example, the output unit 304 may output the result of the second recognition as speech. For example, the output unit 304 may transmit a message indicating the result of the second recognition using an image or characters to an external apparatus via the network 111.

According to the present embodiment, in the mini-batch training, the degree of training is calculated, and since inconsistencies in degree of training between persons is reduced by increasing the sampling probability of the image of the person with a low degree of training, attribute bias of the recognition accuracy at the time of inference can be reduced.

Variation Example

In the first embodiment, the degree of training $N_i$ is obtained using the equation (3) described above. However, in a case in which the training data includes a large number of face images that are not desirable in training for face recognition such as face images with strong blurring, it is not possible to appropriately calculate the degree of training.

In consideration of such a point, the degree of training $N_i$ may be calculated using the representative vectors of each of the n persons acquired by the acquisition unit 204 from the external storage apparatus 104 and the representative vector of the person with the person ID selected in step S204 among the representative vectors without using the feature vector for calculation of the degree of training N as shown in the following equation (4).

$$N_i = \frac{1}{\sum_{j=1, j \neq i}^{n} \cos\theta_{W_i W_j}} \tag{4}$$

In the first embodiment, the training apparatus and the inference apparatus are described as separate apparatuses, but the training apparatus and the inference apparatus may be integrated as one processing apparatus. In this case, the processing apparatus has both the function of the training apparatus and the function of the inference apparatus.

Second Embodiment

Figure 8:
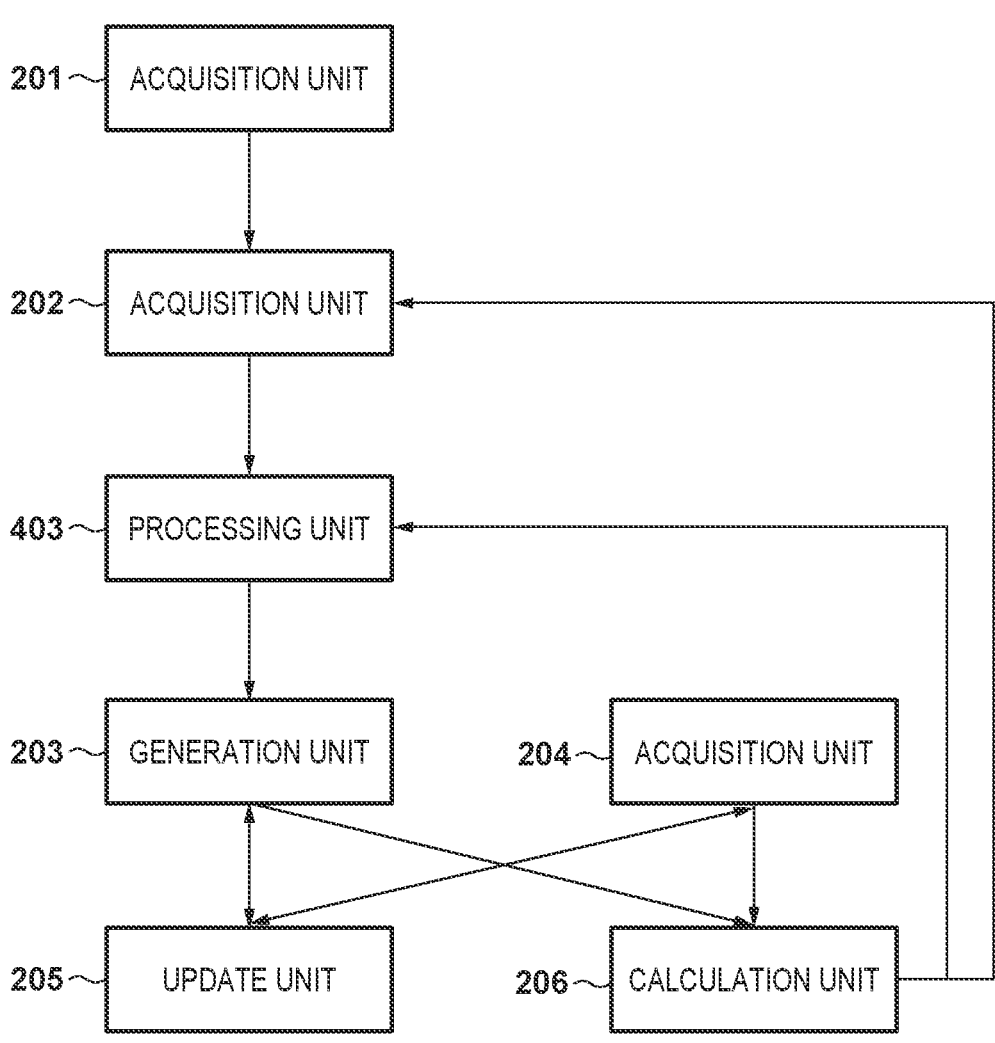
FIG. 8 is a block diagram illustrating a functional configuration example of a training apparatus.

In the present embodiment, differences from the first embodiment will be described, and it is assumed that the present embodiment is similar to the first embodiment unless otherwise specified below. FIG. 8 is a block diagram illustrating a functional configuration example of a training apparatus according to the present embodiment. In FIG. 8, the same functional units as those illustrated in FIG. 2 are denoted by the same reference numerals as those illustrated in FIG. 2, and descriptions related to the functional units will be omitted.

In the first embodiment, the sampling probability in the mini-batch training is obtained in accordance with the degree of training for each person. In the present embodiment, the face image of the person is further processed in accordance with the degree of training. A process is known as Data Augmentation for performing processing, such as changing color tone, with a certain probability when a face image to be used for trained is sampled, and is used as a method of improving the versatility of training models. Versatility can be improved for various face images, such as images of facial expressions and lighting conditions of a person with a low degree of training, by increasing the probability of performing Data Augmentation on a face image of a person with a low degree of training.

Figures 9, 10:
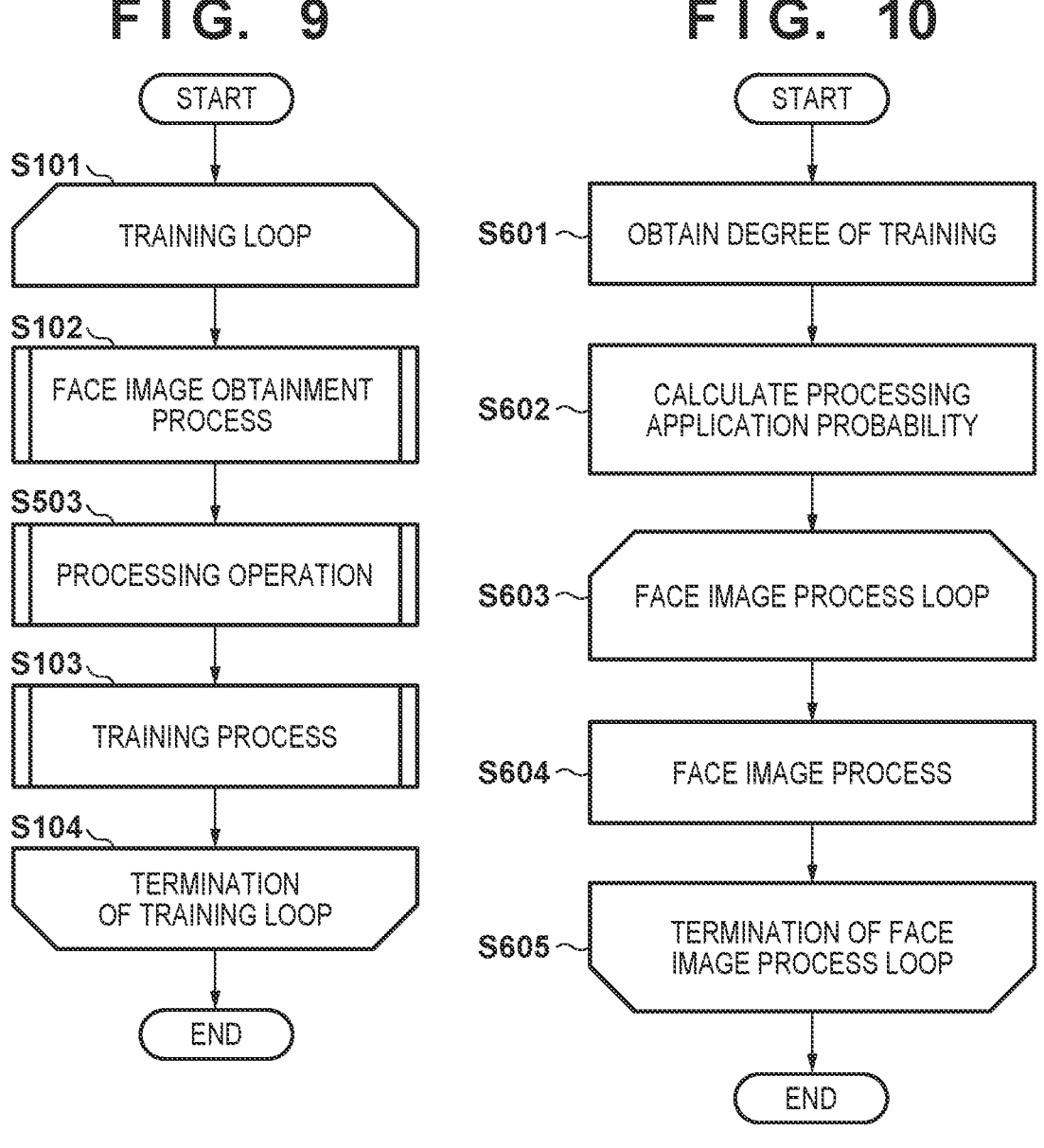
FIG. 9 is a flowchart illustrating a training process to acquire a training model.
FIG. 10 is a flowchart illustrating in detail the process in step S503.

A training process performed by the training apparatus to acquire the training model will be described with reference to the flowchart of FIG. 9. In FIG. 9, process steps similar to process steps depicted in FIG. 3 are denoted with the same step numbers, and descriptions of such process steps will be omitted. The flowchart of FIG. 9 is a flowchart in which step S503 is inserted between step S102 and step S103 of the flowchart of FIG. 3.

In step S503, for each person ID selected in step S204, the probability of performing Data Augmentation on the face image of the person with the person ID is obtained, and the face image is processed based on the probability. The process in step S503 will be described in detail with reference to the flowchart of FIG. 10.

In step S601, a processing unit 403 acquires the degree of training obtained by the calculation unit 206 in step S302 of the previous iteration.

In step S602, for each face image selected in step S205, the processing unit 403 acquires a probability (processing application probability) of performing Data Augmentation on the face image from the managed "degree of training of each of n persons". For example, the processing unit 403 obtains a processing application probability $D_i$ of performing Data Augmentation on the face image with the person ID=i in accordance with the following equation (5).

$$D_i = \left(1 - \frac{N_i}{\sum_{j=1}^{n} N_j}\right) \times d \tag{5}$$

$$0 < d < 1 \tag{6}$$

Here, d is a constant defined by expression (6). The processes of steps S603 to S605 are then repeated a predetermined number of times. In step S604, the processing unit 403 selects one unselected face image from the face images selected in step S205 as a selected face image. The processing unit 403 then acquires the processing application probability obtained in step S602 for the person of the selected face image and determines whether to apply Data Augmentation on the selected face image based on the processing application probability.

For example, it is assumed that the face image of the person with a person ID=1 is selected as the selected face image, and $D_1=0.3$ (30%) is obtained as the processing application probability corresponding to the person with the person ID=1. In this case, as a [1, 1, 1, 1, 1, 1, 1, 0, 0, 0] array, an array is generated having (the number of elements in an array×$D_i$) flag values "0" indicating that Data Augmentation is applied, and one element (flag value) is randomly selected from the array. When the selected flag value is "0", it is determined that Data Augmentation is applied, and when the selected flag value is "1", it is determined that Data Augmentation is not applied. A method such as Cutout described in the document "Terrance DeVries, et al. Improved Regularization of Convolutional Neural Networks with Cutout. arXiv:1708.04552, 2017" is used as a method of processing a face image to which Data Augmentation is applied.

When the selected flag value is "0", the processing unit 403 applies Data Augmentation to the selected face image, and when the selected flag value is "1", the processing unit 403 does not apply Data Augmentation to the selected face image.

In step S605, the processing unit 403 determines whether all of the face images selected in step S205 have been selected as the selected face images. In a case in which all of the face images selected in step S205 are selected as the selected face images, the loop of steps S603 to S605 is terminated. On the other hand, in a case in which a face image remains that has not been selected as the selected face image among the face images selected in step S205, the process proceeds to step S603.

As described above, according to the present embodiment, versatility can be improved for various face images of persons with a low degree of training by adjusting the probability of applying Data Augmentation to the face image of the person according to the degree of training for each person. As a result, attribute bias can be reduced.

In each of the above embodiments and variation example, the person ID is unique identification information for each person, but this is not the sole case, and the person ID may be unique identification information in various units such as country, gender, and type.

Numerical values, processing timings, orders of processing, processing targets, transmission destinations/transmission sources/storage locations of data (information) or the like which are used in each of the embodiments and the variation example described above are given as an example for specific description thereof, and are not intended to be limited to such an example.

In addition, part or all of each of the embodiments and the variation example explained above may be used in combination as appropriate. Some or all of the embodiments and variation example described above may be used selectively.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-083265, filed May 20, 2022, which is hereby incorporated by reference herein in its entirety.

What is claimed is:

1. An image processing apparatus comprising:
  one or more processors; and
one or more memories storing executable instructions which, when executed by the one or more processors, cause the image capturing control apparatus to:
  acquire a feature vector of a training target by inputting an image of the training target to a training model configured to extract a feature vector;
  acquire a degree of training of the training model with respect to the training target based on the acquired feature vector;
  acquire, based on degrees of training of a plurality of training targets, a sampling probability of an image of each of the plurality of training targets in mini-batch training;
  select a sampling image that is sampled from images of the plurality of training targets based on the sampling probability acquired;
  perform training of the training model based on the selected sampling image; and
  perform second recognition of a person based on a face image of the person recognized through first recognition, a captured image including the person, and a training model trained.

2. The image processing apparatus according to claim 1, wherein the instructions, when executed by the one or more processors, further cause the apparatus to:
  acquire, as a degree of training of the training model with respect a training target of interest, a degree of training that is lower as the number of representative vectors increases, the representative vectors being taken from representative vectors of the plurality of training targets and each having a distance to a feature vector obtained based on a single sampling image contained in the training target of interest and the training model that is smaller than a threshold value.

3. The image processing apparatus according to claim 1, wherein the instructions, when executed by the one or more processors, further cause the apparatus to:
  acquire, as a degree of training of the training model with respect to a training target of interest, a degree of training that is lower as the number of representative vectors increases, the representative vectors being taken from representative vectors of the plurality of training targets and each having a distance to a representative vector of the training target of interest that is smaller than a threshold value.

4. The image processing apparatus according to claim 1, wherein the instructions, when executed by the one or more processors, further cause the apparatus to:

acquire a higher sampling probability as a sampling probability of a training target with a lower degree of training.

5. The image processing apparatus according to claim 1, wherein the instructions, when executed by the one or more processors, further cause the apparatus to:

acquire a probability of performing processing on the sampling image, based on a degree of training of the training model with respect to the sampling image; and perform processing on the sampling image in accordance with the probability of performing the processing on the sampling image.

6. The image processing apparatus according to claim 5, wherein the instructions, when executed by the one or more processors, further cause the apparatus to:

generate an array including a flag value indicating to perform the processing and a flag value indicating not to perform the processing based on the probability of performing the processing, and determines whether to perform image processing on the sampling image in accordance with the flag value selected from the array.

7. The image processing apparatus according to claim 6, wherein the first recognition is recognition using recognition information indicating an individual input by a user.

8. The image processing apparatus according to claim 1, wherein the instructions, when executed by the one or more processors, further cause the apparatus to:

generate an array of the number of elements corresponding to the sampling probability of each of the plurality of training targets, and performs training based on an image corresponding to a training target selected from the array.

9. An image processing method performed by an image processing apparatus, the method comprising:

acquiring a feature vector of a training target by inputting an image of the training target to a training model configured to extract a feature vector;

acquiring a degree of training of the training model with respect to the training target based on the acquired feature vector;

acquiring, based on degrees of training of a plurality of training targets, a sampling probability of an image of each of the plurality of training targets in mini-batch training;

selecting a sampling image that is sampled from images of the plurality of training targets based on the sampling probability acquired;

performing training of the training model based on the selected sampling image; and performing second recognition of a person based on a face image of the person recognized through first recognition, a captured image including the person, and a training model trained.

10. A non-transitory computer-readable storage medium storing a computer program for causing a computer to:

acquire a feature vector of a training target by inputting an image of the training target to a training model configured to extract a feature vector;

acquire a degree of training of the training model with respect to the training target based on the acquired feature vector;

acquire, based on degrees of training of a plurality of training targets, a sampling probability of an image of each of the plurality of training targets in mini-batch training;

perform training of the training model, based on a sampling image that is sampled from images of the plurality of training targets based on the sampling probability acquired;

select a sampling image that is sampled from images of the plurality of training targets based on the sampling probability acquired;

perform training of the training model based on the selected sampling image; and perform second recognition of a person based on a face image of the person recognized through first recognition, a captured image including the person, and a training model trained.

11. The image processing apparatus according to claim 1, wherein the image of the training target with higher sampling probability are more likely to be selected as the sampling image.

12. The image processing apparatus according to claim 1, wherein the instructions, when executed by the one or more processors, further cause the apparatus to:

perform the training of the training model based on not images other than the selected sampling image among the images of the plurality of training targets but the selected sampling image.

* * * * *